Nov. 8, 1932.  G. K. O'CONNOR  1,886,575
MULTIPLE FLOW REGULATION
Filed Aug. 10, 1931   3 Sheets-Sheet 1
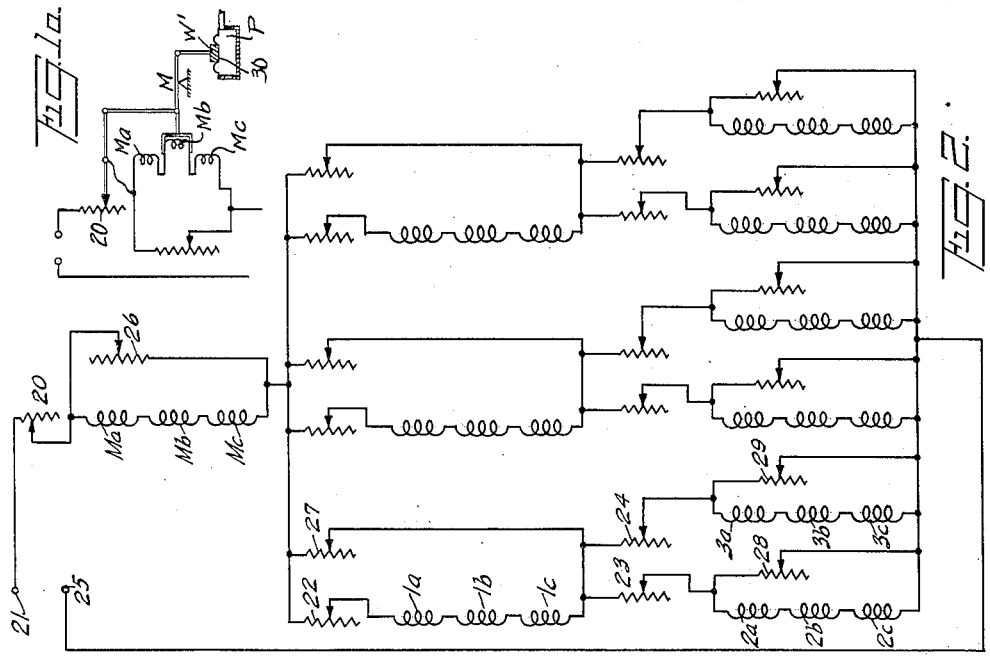
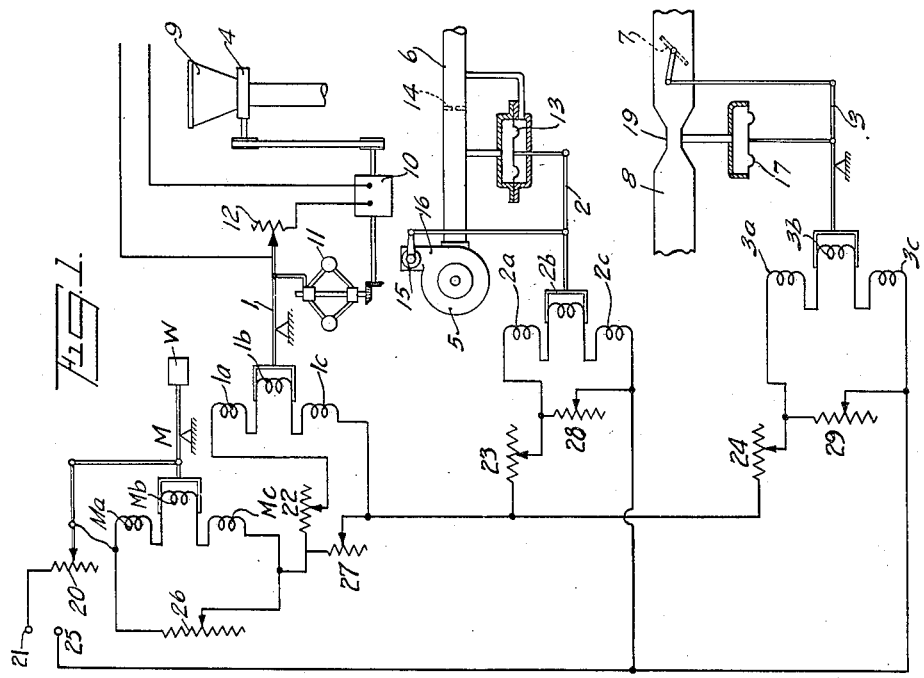
INVENTOR
George K. O'Connor
BY
Bartlett, Eyre, Scott & Keel
ATTORNEY

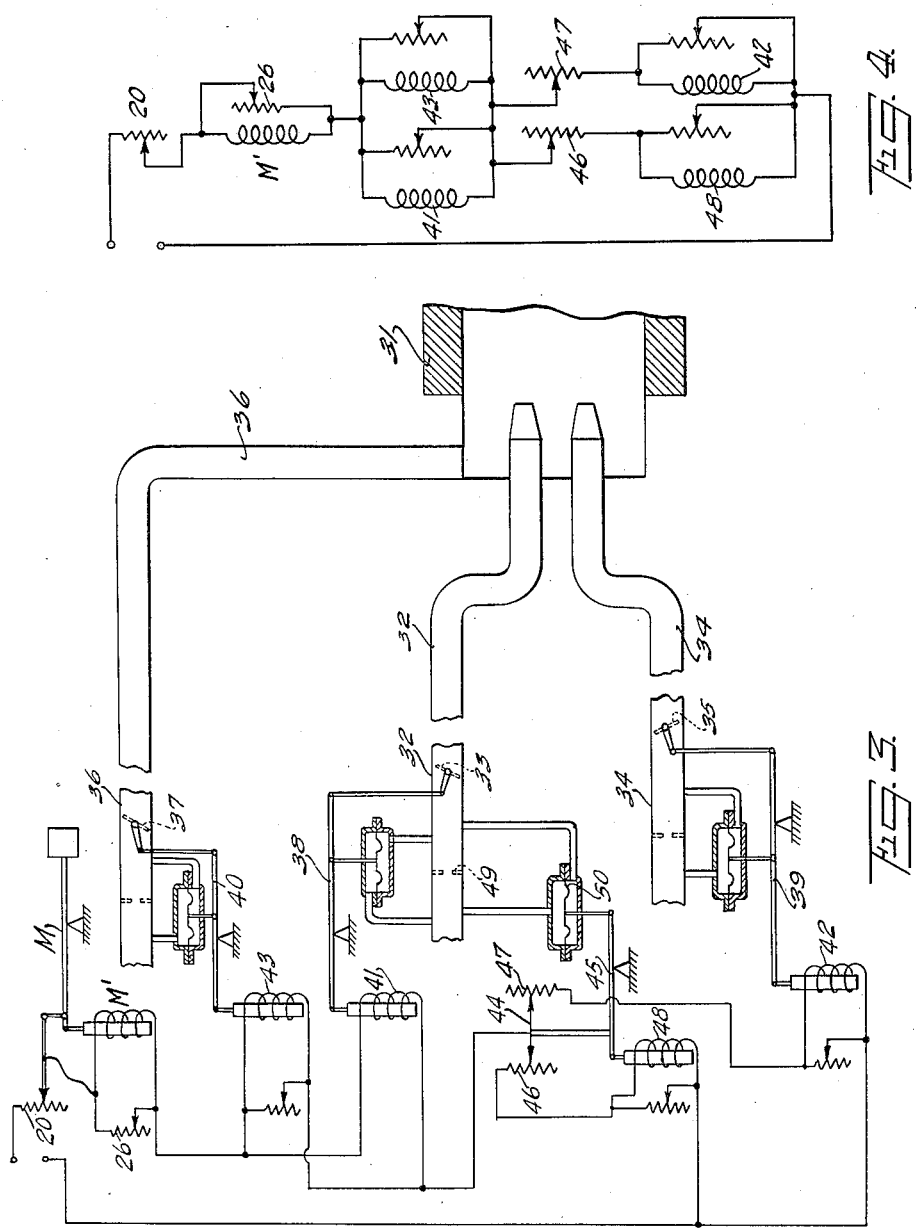

Nov. 8, 1932.  G. K. O'CONNOR  1,886,575
MULTIPLE FLOW REGULATION
Filed Aug. 10, 1931   3 Sheets-Sheet 3
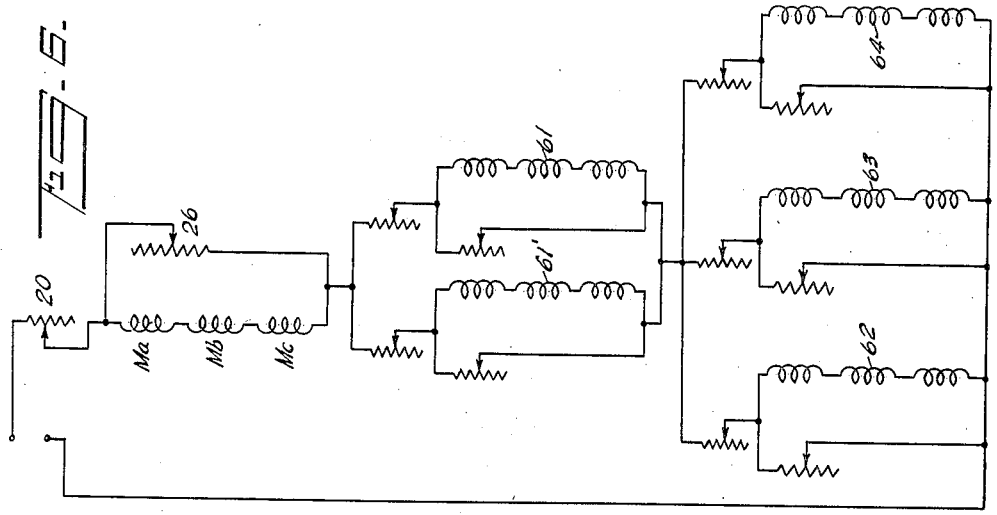
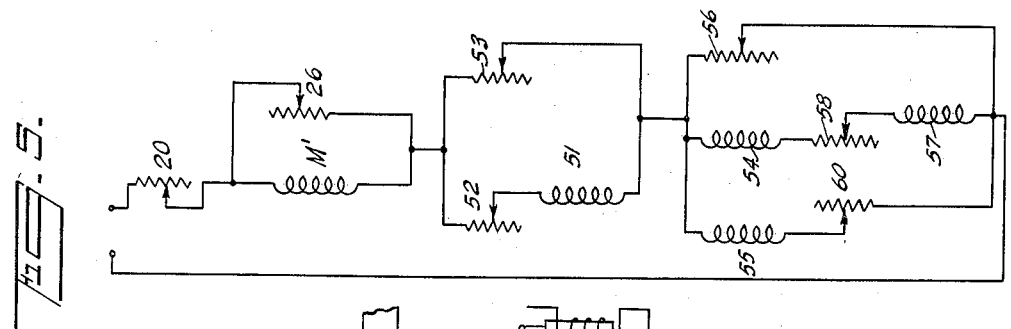
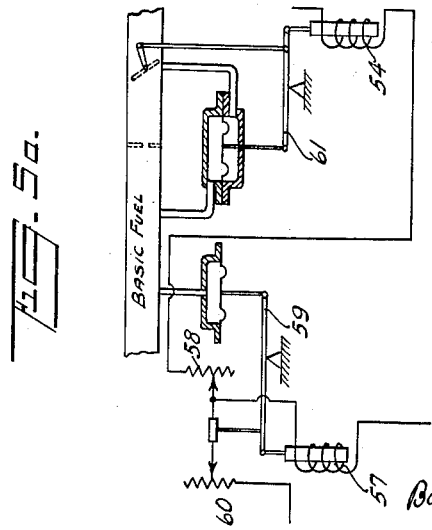
INVENTOR
*George K. O'Connor.*
BY
*Bartlett, Eyre, Scott & Keel*
ATTORNEY Patented Nov. 8, 1932

1,886,575

UNITED STATES PATENT OFFICE

GEORGE K. O'CONNOR, OF FAIRLAWN, NEW JERSEY, ASSIGNOR TO SMOOT ENGINEERING CORPORATION, OF NEW YORK, N. Y., A CORPORATION OF DELAWARE

MULTIPLE FLOW REGULATION

Application filed August 10, 1931. Serial No. 556,063.

My present invention relates to an electrical regulating system for quantities of the flow type whereby one quantity or the sum of several quantities may be proportioned to the sum of a plurality of other quantities or to the sum of linear functions thereof.

My regulating system is in some respects like that described and broadly claimed in my co-pending application Serial No. 537,336, filed May 14, 1931 issued Sept. 13, 1932, as Patent No. 1,877,576, but differs from that specifically disclosed in said patent in that electric rather than pneumatic means are employed for the creation of control forces. As in the above mentioned patent, my regulating system includes a means for creating a volume controlled master flow, in this instance an electric current, means for subdividing the master flow into a plurality of component flows, and regulators controlled by forces varying with the squares of the component flows whereby the sum of the controlled flows are maintained in proportion to the master flow.

In regulating a plurality of flows to maintain their sum or difference in proportion to a fixed or varying quantity it is not sufficient to maintain the sum or difference of the pressure differentials measuring the flows in proportion to the quantity because a pressure differential is not a linear function of the flow it measures but varies as the square thereof. For this reason difficulties have heretofore been encountered in regulating, for example, furnaces in which a plurality of fuels are burned, or return oil burner systems in which the air supply for proper combustion should be maintained in proportion to the difference between the oil flows to and from the burner. The present invention comprises a relatively simple electrical circuit arrangement and regulators associated therewith that lends itself to the ready solution of a variety of problems in multiple flow regulation.

For a better understanding of the invention and of specific applications thereof to furnace regulation reference may be had to the accompanying drawings of which:

Fig. 1 illustrates diagrammatically the invention applied to the maintenance of the sum of two quantities of the flow type in proportion to a predetermined constant value and to a third quantity of the flow type.

Fig. 1a is a fragmentary view illustrating a modification of one portion of Fig. 1 to permit automatic variation of the value at which the sum of the two quantities is maintained.

Fig. 2 is a diagram of the circuit of Fig. 1 extended to the control of three units each of the type of Fig. 1.

Fig. 3 illustrates the invention applied to the control of basic and make up fuels for a furnace and of the air for burning the fuel.

Fig. 4 is a diagram of the circuit of Fig. 3.

Fig. 5 is a diagram of another circuit suitable for use in the control of basic and make up fuels and of the air therefor.

Fig. 5a is a fragmentary view explanatory of a portion of the circuit of Fig. 5 and Fig. 6 is a diagram of a circuit suitable for use to maintain the sum of two flows in proportion to the sum of three other flows.

In Fig. 1 the sum of two quantities controlled by regulators 2 and 3 are maintained in proportion to a quantity controlled by regulator 1. By way of illustration, regulator 1 is shown as controlling the speed of rotation of a pulverized fuel feeder 4, regulator 2 as controlling the steam delivered to a blower motor 5 delivering air under pressure to a conduit 6, and regulator 3 as controlling a damper 7 in an air supply conduit 8. Conduit 6 may be considered as the primary air duct and conduit 8 as the secondary air duct for a furnace supplied with fuel from the hopper 9. Regulators 1, 2 and 3 are illustrated diagrammatically as comprising pivoted balancing levers acted upon at one end by forces varying as the square of the functions controlled and at the other end by forces varying as the square of electric currents passing through the coils of Kelvin balances, the movable coils of which are carried by the levers; the balance levers upon unbalance of the forces acting thereupon operating to effect the regulation. A force varying with the square of the speed of motor 10 driving the fuel feeder 4 is transmitted to the balance lever of regulator 1 by a centrifugal device 11 and counterbalances thereon the force varying with the square of the electric current passing through coils 1a, 1b and 1c. Upon a departure from balance caused by a change in speed of the motor 10 or of the current in coils 1a, 1b and 1c regulator 1 varies a resistance 12 in the circuit of motor 10 to change the speed thereof in a direction to restore the balance of forces upon the regulator.

A force varying with the square of the flow through conduit 6 is transmitted to the balance lever of regulator 2 by a diaphragm 13 acted upon by the pressure differential across a restriction 14 in conduit 6 and opposes thereon the force varying with the square of the current through coils 2a, 2b and 2c. Departure of regulator 2 from balance operates a valve 15 in the steam supply pipe 16 leading to the blower 5 to maintain the air flow in conduit 6 proportional to the current in coils 2a, 2b and 2c. Similarly, a force varying with the square of the flow through conduit 8 is transmitted to the balance lever of regulator 3 by a diaphragm 17 acted upon by the pressure in the neck of a Venturi section 19 of conduit 8 and opposes thereon a force varying with the square of the current through coils 3a, 3b and 3c; regulator 3 operating upon unbalance of the forces to adjust damper 7 in a direction to restore the balance of forces.

The circuit now to be described maintains the sum of the currents in coils 2a, 2b, 2c and 3a, 3b and 3c in proportion to the current through coils 1a, 1b and 1c and permits adjustment of the ratio by variation of the current through the coils of any one of the regulators, thus maintaining the sum of the flows through conduits 6 and 8 in proportion to the feed of fuel and permitting adjustment of the individual flows. Furthermore the circuit permits of variation of all of the currents together without disturbing desired ratios and thus permits, in the specific embodiment illustrated, of adjustment of the total heat input to the furnace to which the fuel and air may be delivered without disturbing the fuel-air ratio.

The circuit including the coils of each regulator may be best understood from Fig. 2.

One end of a set of master coils Ma, Mb, Mc, is connected through a variable resistor 20 with one terminal 21 of any suitable source of electromotive force and the other end of the coils Ma, Mb, Mc is connected through an adjustable resistance 22 with the coils 1a, 1b, 1c. The other end of coils 1a, 1b, 1c is connected through resistance 23 with coils 2a, 2b, 2c and through resistance 24 with coils 3a, 3b, 3c, the other end of these latter sets of coils being connected with the other terminal 25 of the source of electro-motive force.

An adjustable resistance 26 is shunted across coils Ma, Mb, Mc; a resistance 27, across resistor 22 and coils 1a, 1b, 1c; a resistance 28, across coil 2a, 2b, 2c; a resistance 29 across coils 3a, 3b, 3c. Associated with the coils Ma, Mb, Mc is a regulator M (Figs. 1 and 1a) generally similar to regulators 1, 2 and 3 which operates to adjust the resistance 20 to maintain a predetermined master current through the circuit as measured by coils Ma, Mb, Mc. In Fig. 1 this current is maintained constant at a value determined by the position and magnitude of a weight W acting upon the balance lever of regulator M in opposition to the force varying as the square of the current through the master coils. In Fig. 1a the master current is varied in inverse response to the pressure P acting upon the lever in opposition to the force of a weight $W^1$ through a diaphragm 30. The pressure P may for example be that of the steam generated in a boiler furnace to which the fuel from hopper 9 and air from conduits 6 and 8 are delivered or it may be some arbitrarily varying pressure in accordance with which it is desired that the master current be regulated.

To control a plurality of units, for example, a plurality of furnaces, that portion of the circuit including the fuel and air controlling coils is duplicated for each unit and connected in parallel between the master coils Ma, Mb, Mc and the terminal 25 of the source of electro-motive force. In Fig. 2 such a circuit for controlling three units is indicated.

The circuit of Fig. 2 maintains the sum of linear functions of the currents through coils 2a, 2b, 2c and 3a, 3b, 3c in proportion to the current through coils 1a, 1b, 1c for any constant settings of the adjustable resistances. This will be apparent from the fact that the sum of the currents through resistances 23 and 24 must necessarily be equal to the sum of the currents through coils 1a, 1b, 1c and resistance 27 and that the current through these coils 1a, 1b, 1c is always a definite fraction of this sum and similarly the currents through coils 2a, 2b, 2c and 3a, 3b, 3c are always definite fractions of the currents through resistances 23 and 24 respectively. If resistance 28 or 29 is so adjusted as to make the ratio thereof with the resistance of coils 2a, 2b, 2c equal to the ratio of resistance 29 with that of coils 3a, 3b, 3c, then the actual sum of the currents through coils 2a, 2b, 2c and 3a, 3b, 3c is proportioned to the current through coils 1a, 1b, 1c. Regulator M, by adjustment of resistance 20 maintains the total current constant, (Fig. 1) or varies it as desired (Fig. 1a) without affecting the distribution of the current between the coils of regulators 1, 2 and 3, and, therefore, without disturbing the flow ratios controlled by these regulators. Adjustment of resistance 26 varies the total current and therefore the magnitude of the controlled flows. Adjustment of resistances 22 or 27 varies the current through coils 1a, 1b, 1c, and therefore the ratio between the controlled flows but does not vary the magnitude of the flows controlled by regulators 2 and 3. Adjustment of resistances 23, 24, 28 or 29 varies the current through coils 2a, 2b, 2c and coils 3a, 3b, 3c to vary the ratio between the flows controlled by regulators 2 and 3 without disturbing the ratio of the sum of their linear functions to the flow controlled by regulator 1.

When several units are controlled together, as in Fig. 2, any of the above adjustments to the ratios maintained by any one unit has no effect upon the ratios maintained at another unit. Any change in the actual magnitudes of the flows controlled by the other units by such adjustments may be readily compensated for by adjustment of resistance 26 at the master. Where the units control the flow of fuel and air to furnaces, adjustment of the total heat input to the furnaces is effected by adjustment of resistance 26 or automatically (Fig. 1a) by variation of resistance 20 to vary the total current.

Instead of the control of a single fuel and of the primary and secondary air flows therefor, the arrangement of Figs. 1 and 2 could as well be employed for the control of two fuels (by regulators 2 and 3) and of a single air flow therefor (by regulator 1) to maintain the air flow in proportion to the sum of the air requirement of the two fuels. Another application of the circuit of Figs. 1 and 2 would be for the control of a return oil burner system. In this case regulator 1 would control the inlet oil flow and regulators 2 and 3 the outlet oil flow and the air flow, respectively. Inasmuch as this arrangement would maintain the sum of the oil outlet and air flows in proportion to the oil inlet flow, it follows that, with suitable adjustment of the resistances, the air flow would be proportioned to the difference between the oil inlet and outlet flows, that is, to the oil consumed by the burner system. Suitable adjustment of the resistances for this purpose, if regulator 2 controls the oil outlet flow, is to make the ratio of resistance 28 to that of coils 2a, 2b, 2c equal to the ratio of resistance 27 to the sum of that of coils 1a, 1b, 1c and resistance 22.

In Figs. 3 and 4 application of the invention to the control of basic and make-up fuels and of the air for burning the fuels is illustrated. Basic fuel flows to a furnace 31 through a conduit 32 under control of a damper 33. Make-up fuel, when the supply of basic fuel is insufficient flows to the furnace through a conduit 34 under control of a damper 35. The air is delivered through a conduit 36 under control of a damper 37. Dampers 33, 35, 37 are controlled by regulators 38, 39 and 40, respectively, in response to pressure differentials varying as the squares of the flows through the respective conduits 32, 34 and 36 and in response to forces varying as the squares of the currents flowing through solenoids 41, 42 and 43 respectively.

It will be understood that the solenoids 41, 42, and 43 are equivalent to the regulator coils of Figs. 1 and 2 in their reaction upon the regulator balances associated therewith; the solenoids exerting forces varying as the square of the current therethrough upon magnetic cores in their fields and carried by the associated balances. A master regulator M, as in Fig. 1, adjusts resistance 20 to maintain a predetermined current through the master coil M'. Coils 41 and 43 are connected in parallel between the master coil and a conducting arm 44 movable by a regulator 45 to oppositely vary resistances 46 and 47. Resistance 46 is connected to the solenoid 48 of regulator 45 and resistance 47 is connected to coil 42. Acting upon regulator 45 in opposition to the force varying as the square of the current through solenoid 48 is a force varying with the square of the flow of basic fuel as measured by the pressure across a restriction 49 in conduit 32 and transmitted to either side of a diaphragm 50 connected to the balance lever of the regulator.

Regulator 45 operates to maintain the current through coil 48 in proportion to the actual flow of basic fuel by adjustment of resistance 46 and to so vary the current through coil 42 as to compensate for a deficiency in basic fuel. For example, assume the resistance 26 at the master is set for a large fuel and air input to the furnace and that the supply of basic fuel is insufficient to meet the demand. Regulator 38 will go out of range and move damper 33 to its wide open position. Regulator 45, in response to the reduction of flow through conduit 32 relative to the current through coil 48, operates to increase the resistance 46 and decrease the resistance 47 until the current through coil 48 is reduced to a value proportional to the basic fuel flow. The decrease in resistance 47 increases the flow through solenoid 42 and hence causes operation of regulator 39 to open damper 35 until the flow of make up fuel is proportioned to the current through coil 42. As the above operation results in a basic fuel flow proportional to the current in coil 48 and a make-up fuel flow proportional to the current in coil 42 it will be apparent by reference to Fig. 2 and the description thereof, that the sum of the fuel flows will be proportioned to the air flow which regulator 40 maintains in proportion to the current through coil 43. When the supply of basic fuel increases, regulator 45 acts oppositely from that above described to increase the current through coil 48 and to decrease or cut off that through coil 42. Preferably the arrangement is such that damper 35 is maintained completely closed to shut off the flow of make-up fuel when a minimum current flows through coil 42 due to maximum resistance 47 in series therewith. Thus, under normal conditions, that is when the supply of basic fuel is sufficient, regulators 38 and 40 maintain the desired ratio between fuel and air, while, upon failure of the basic fuel supply, regulators 45 and 39 insure the proportionality of the sum of the fuel flows to the air flow.

In Figs. 5 and 5a is illustrated diagrammatically an alternative arrangement for controlling basic and make-up fuel flows to a furnace and the flow of air for burning the same. The master, as in Fig. 4, comprises the master coil M' and shunting resistance 26. An air regulator coil 51 is in series with the master coil M' and with adjustable resistance 52. An adjustable resistance 53 shunts the coil 51 and resistance 52. In series with the parallel branches containing the coil 51 and resistance 53 is a circuit having three branches in one of which is the basic fuel flow regulator coil 54, in another the make-up fuel regulator coil 55 and in the third an adjustable resistance 56. In the branch containing coil 54 is a regulator coil 57 (see also Fig. 5a) and a resistance 58 controlled by a regulator 59 in response to the square of the current through coil 57 and to the supply pressure of the basic fuel. In the branch containing coil 55 is a resistance 60 also controlled by regulator 59 and varied oppositely to resistance 58 upon a departure from balance between the basic fuel supply pressure and the square of the current through coil 57. With this arrangement regulator 61 (Fig. 5a), controlling the basic fuel flow in response to the square of the current through coil 54 and to the pressure differential measuring the fuel flow, is always maintained in range; the current through coil 54 being reduced to insure this result by regulator 59 upon a failure of the fuel supply pressure and the current through make-up fuel regulator coil 55 being proportionally increased by variation of resistance 60 to insure that the sum of the fuel flows will be always maintained in proportion to the air flow. Adjustment of resistance 53 varies the fuel air ratio by varying the air flow. Adjustment of resistance 56 varies this ratio by varying the fuel flow or flows. Adjustment of resistance 26 at the master varies the total heat input without disturbing the fuel air ratio.

In Fig. 6 a circuit is diagrammatically illustrated adapted for the control of the ratio between the sum of two flow quantities and the sum of three flow quantities. Two similar parallel circuits including regulator coils 61 and 61' respectively and shunting and series adjustable resistances therewith are connected between the master coils Ma, Mb, Mc and three similar parallel circuits containing regulator coils 62, 63 and 64 respectively and shunting and series adjustable resistances therewith. By this arrangement the linear functions of the flow quantities controlled in response to the current through coils 61 and 61' will be maintained in proportion to the sum of linear functions of the flow quantities controlled in response to the currents through coils 62, 63 and 64. With suitable choice of resistance the sums of the actual quantities, rather than that of linear functions thereof may be maintained proportional if desired. The conditions for the maintenance of such a ratio are that the ratio of the resistance of each coil 62, 63 and 64 to that of its shunt be equal and that similarly the ratio of the resistance of coil 61 to that of its shunt be equal to the ratio of the resistance of coil 61' to its shunt.

The invention has now been described in connection with its application to the control of fuel and air to furnaces and to the control of return oil burner systems. Two specific applications to the control of make-up and basic fuel supplies have been illustrated. Obviously the invention is not limited to the specific embodiments illustrated but may be advantageously employed wherever sums or differences of flow quantities, that is quantities which are ordinarily measurable by forces varying as the square thereof, are to be regulated. By reference to the drawings and to the accompanying description thereof it will be noted that the invention in its broadest aspect comprises a series parallel electric circuit in which the total current is automatically controlled, either to a constant or to a varying value, and in which current through one set of parallel branches thereof is utilized to so control quantities as to maintain the sum of linear functions thereof or their actual sum proportional to the sum of linear functions or to the actual sum of quantities controlled by currents in another set of parallel branches; the two sets of parallel branches being connected in series in the circuit. In specific cases one or the other of said sets may be but a single branch in which case the sum of linear functions or the actual sum as desired of the quantities controlled by currents in the remaining set of parallel branches are maintained in proportion to a single quantity controlled by the current through the single branch.

I claim:

1. An electrical regulating system for maintaining the sum of linear functions of a plurality of flow quantities in proportion to a single flow quantity which comprises in combination an electrical circuit having a plurality of parallel branches, means for maintaining a predetermined total current through said circuit, a balancing device responsive to a force varying as the square of the total current through said circuit and to a force varying as the square of the single flow quantity for controlling said single quantity upon departure from balance of said forces, and a plurality of other balancing devices each associated with one of said other quantities and adapted to control the same in response to a force varying as the square thereof and to a force varying as the square of the current through one of said branches.

2. An electrical regulating system for maintaining the sum of linear functions of a plurality of flow quantities in proportion to the sum of linear functions of other flow quantities which includes an electrical network having two sets of parallel branches connected in series, means for controlling each of the plurality of first mentioned quantities in response to a force varying as the square of the current through different branches of one of said sets of parallel branches and means for controlling each of the plurality of other quantities in response to a force varying as the square of the current through different branches of the other of said sets of parallel branches whereby the sum of linear functions of the first mentioned quantities is proportioned to the sum of linear functions of the other quantities and to the total current through said network.

3. A regulating system according to claim 2, including a device responsive to a force varying as the square of the total current through said network for controlling the total current.

4. A regulating system for maintaining an air flow equal to the sum of the air requirements for a plurality of fuel flows which includes in combination a regulator for the air flow and a regulator for each fuel flow, each regulator having a coil associated therewith and being responsive to a force varying as the square of the current through the coil and each regulator also being responsive to a force varying as the square of the flow controlled thereby, the coils associated with the fuel regulators being connected in parallel and the coil associated with the air regulator being in series with said other coils.

5. A regulating system according to claim 4, including adjustable resistances in series with the coils associated with said fuel regulators and additional adjustable resistances shunting said fuel regulator coils for varying the ratio between various fuel flows.

6. A regulating system according to claim 4, including a master regulator responsive to a control force and having a master coil associated therewith connected in series with said other coils, and a resistance in series with said master coil and variable by said master regulator upon unbalance between said control force and a force varying as the square of the current through said master coil.

7. A regulating system for the control of basic and make-up fuel supplies and of the air supply therefor, comprising in combination a regulator for the air supply, a regulator for each fuel supply, means at each regulator for acting thereupon with a force varying as the square of the rate at which the fuel or air controlled by that regulator is supplied, a coil associated with each regulator to impose thereupon a force varying as the square of the current through the coil, a device responsive to a function of the basic fuel supply, and a coil associated with said device, said device being arranged to vary the current through the coil associated therewith to maintain the same in proportion to the flow of basic fuel and being arranged to oppositely vary the current through the coil associated with the regulator for the make-up fuel supply, said two last mentioned coils being connected in parallel and both in series with the coil associated with said regulator for the air supply.

8. The combination according to claim 7 wherein the coil associated with the regulator for the basic fuel supply is connected in parallel with the coil associated with the regulator for the air supply and wherein master control means are provided for controlling the total current through the network including the regulator coils.

9. The combination according to claim 7 wherein the coil associated with the regulator for the basic fuel supply is connected in series with the coil associated with said device and in parallel with the coil associated with the regulator for the make-up fuel supply.

10. A regulating system for maintaining one flow in proportion to the difference between two other flows comprising in combination a regulator for each flow and a coil associated with each regulator to impose thereupon a force varying as the square of the current through the coil, each regulator being arranged to measure the flow controlled thereby to maintain the same in proportion to the current through the associated coil, the coil associated with the regulator for the flow of greatest magnitude being connected in series with the coils associated with the other regulators, these latter coils being connected in parallel.

11. The combination according to claim 10, including a master controller having a coil associated therewith connected in series with said other coils, said master controller being arranged to control the total current through the circuit including all of the coils.

In testimony whereof, I have signed my name to this specification.

GEORGE K. O'CONNOR.